United States Patent [19]

Muramatsu et al.

[11] 3,771,662
[45] Nov. 13, 1973

[54] OIL RECOVERY SYSTEM

[75] Inventors: Tateo Muramatsu; Kuninori Aramaki, both of Yokohama; Yoshikazu Kondo, Tokyo, all of Japan

[73] Assignee: Bridgestone Tire Company Limited, Tokyo, Japan

[22] Filed: Apr. 18, 1972

[21] Appl. No.: 245,245

[30] Foreign Application Priority Data
Apr. 30, 1971  Japan .................. 46/27911

[52] U.S. Cl. .................. 210/242, 210/DIG. 21
[51] Int. Cl. .................. E02b 15/04
[58] Field of Search .......... 210/83, 242, DIG. 21; 61/1 F

[56] References Cited
UNITED STATES PATENTS

| 3,650,406 | 3/1972 | Brown | 210/DIG. 21 |
|---|---|---|---|
| 3,523,611 | 8/1970 | Fitzgerald | 210/242 |
| 3,667,235 | 6/1972 | Preus | 61/1 F |
| 3,563,036 | 2/1971 | Smith et al. | 61/1 F |
| 3,665,713 | 5/1972 | Rath | 61/1 F |
| 3,662,891 | 5/1972 | Headrick | 210/242 |
| 3,593,526 | 7/1971 | Hoult et al. | 61/1 F |
| 3,592,007 | 7/1971 | Renner | 61/1 F |
| 3,590,584 | 7/1971 | Fitzgerald | 210/242 |

Primary Examiner—Frank A. Spear, Jr.
Assistant Examiner—T. A. Granger
Attorney—Martin Fleit et al.

[57] ABSTRACT

A system for recovering oil spilled on water surface, by sweeping oil films on the water surface into a mobile U-shaped oil fence line. An oil-collecting zone is formed in the U-shaped oil fence line, where all the oil films swept thereby are collected to form a comparatively thick oil film, so that the oil is efficiently removed from that zone.

5 Claims, 7 Drawing Figures

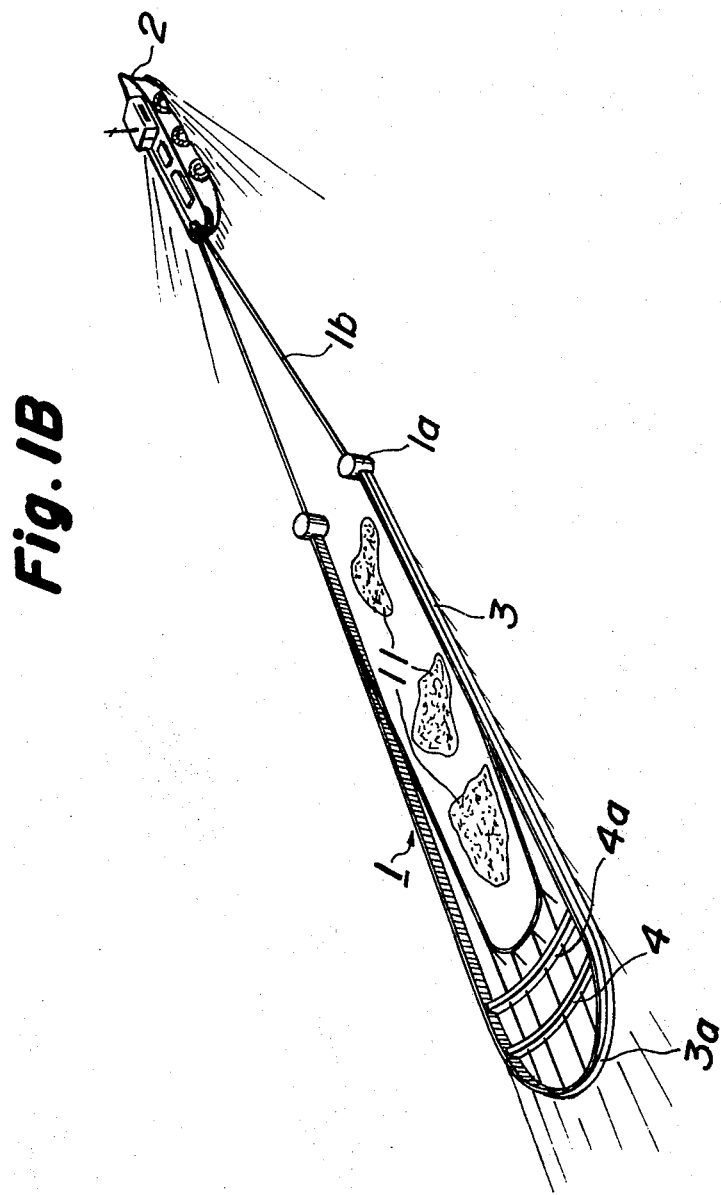

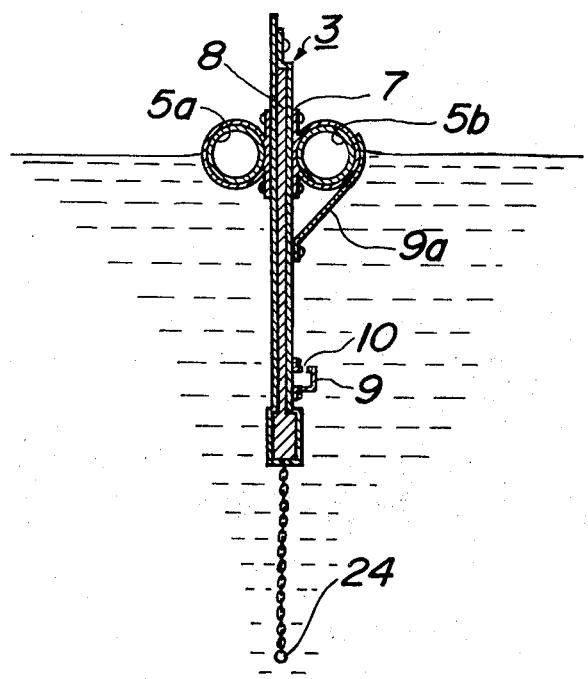

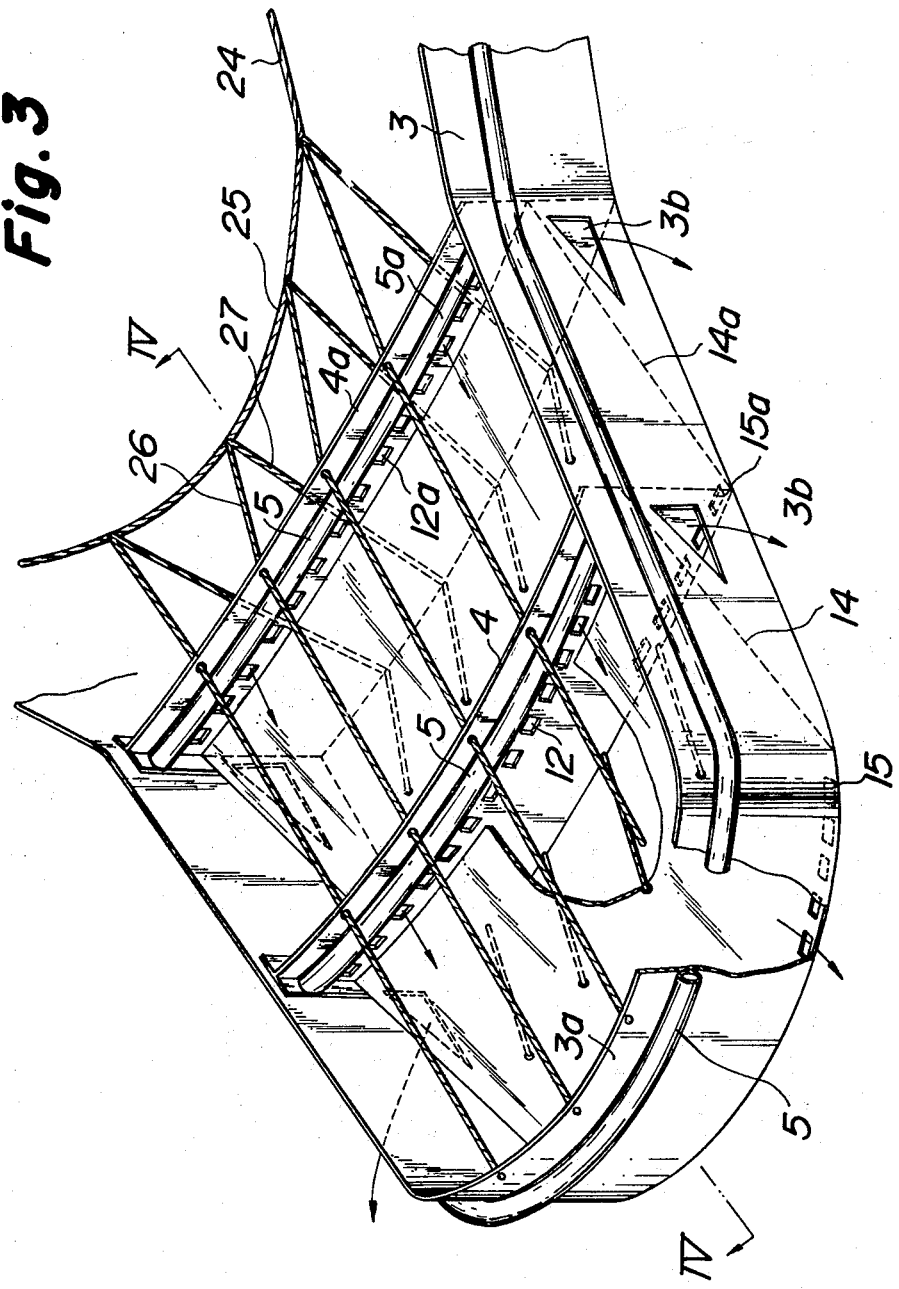

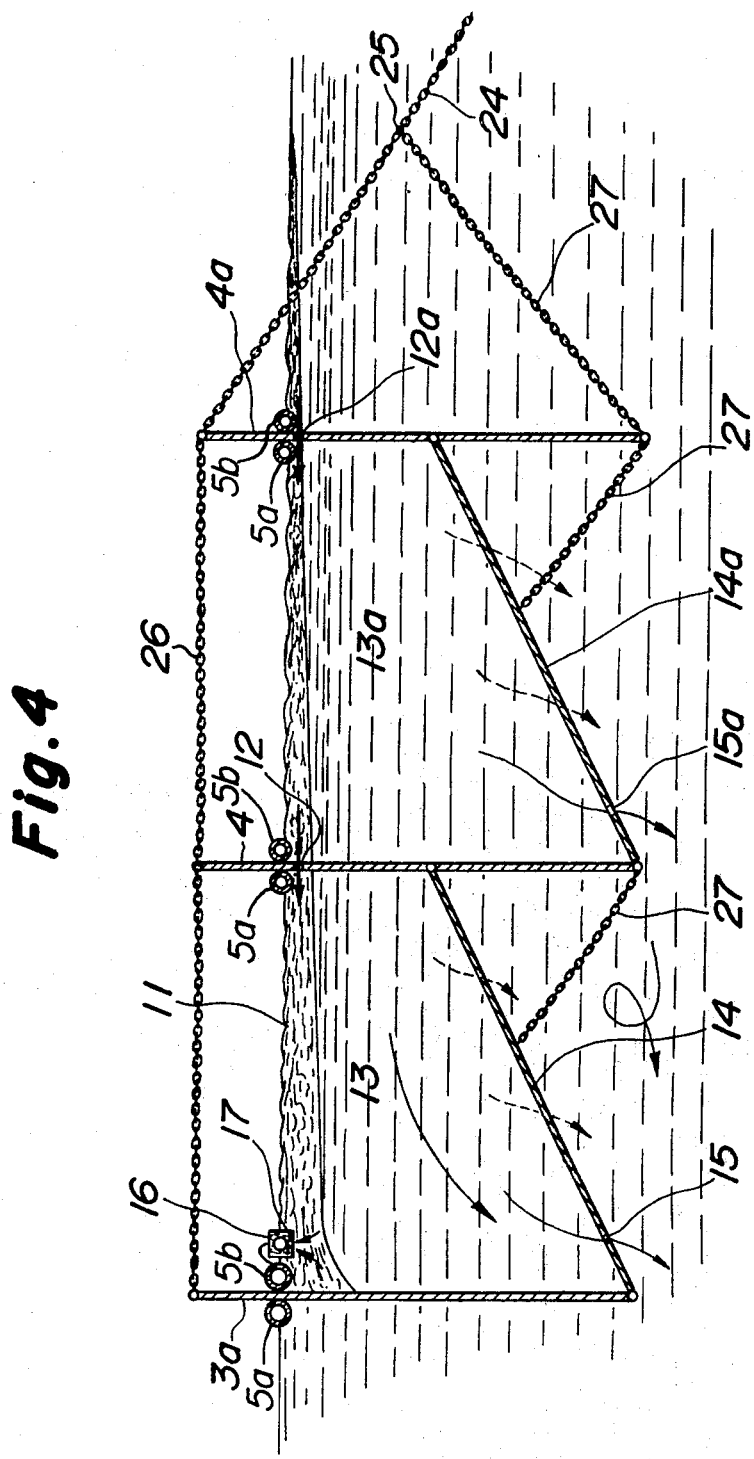

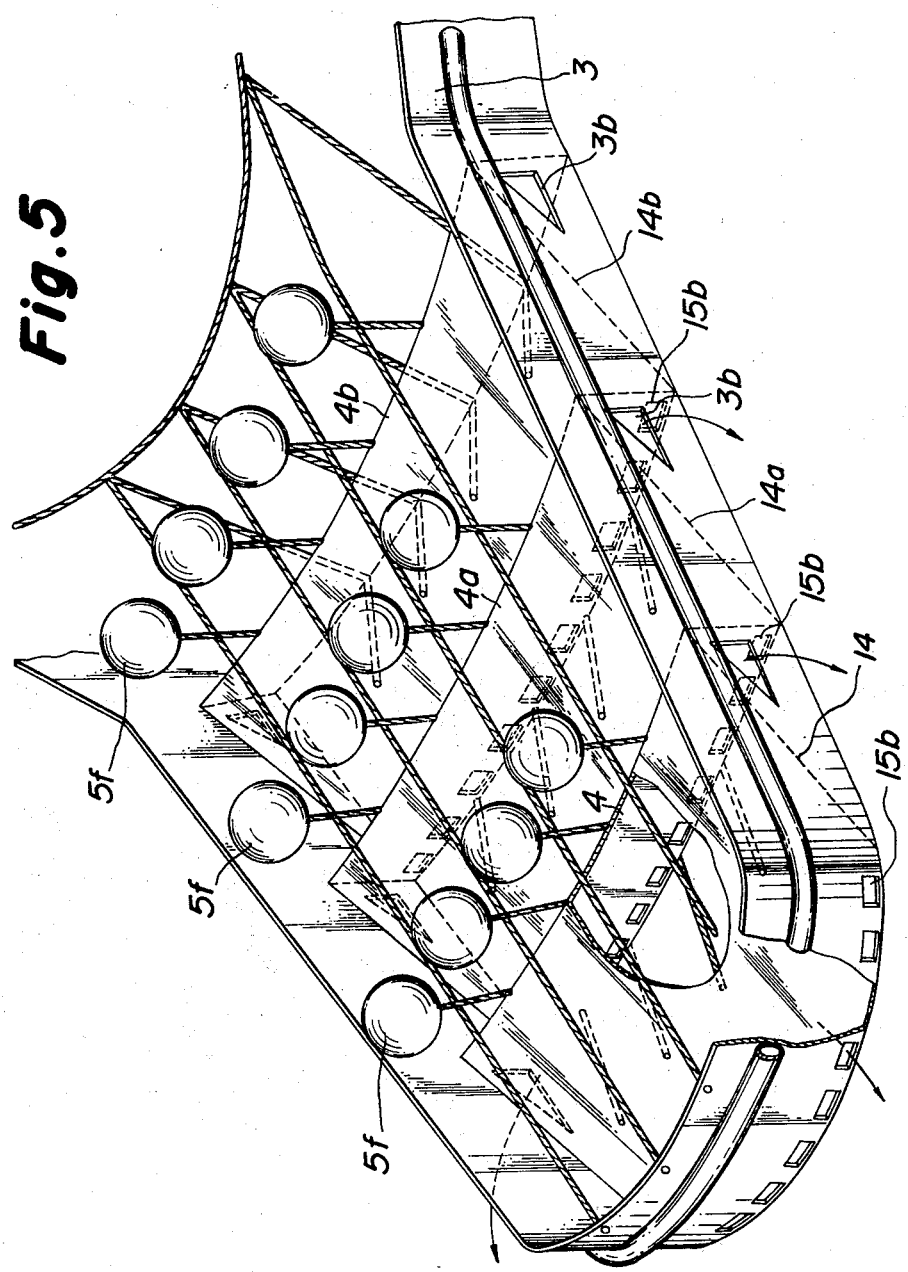

OIL RECOVERY SYSTEM

BACKGROUND OF THE INVENTION

1. Field of the Invention:

This invention relates to an oil recovery system suitable for recovering oil spilled on water surface, and more particularly to a method and a device for recovering or collecting oil spilled on water surface from an ocean-going tanker or the like during loading and unloading.

2. Description of the Prior Art:

There are a number of different types of oil fence available for preventing spilled oil or other drifts from dispersing beyond the boundary of an area. Sometimes, it is necessary to remove such spilled oil or drifts from the water surface, for purposes of preventing water pollution. With conventional oil fences, in order to recover such spilled oil, it has been necessary to let a lighter or a boat with suction pumps to enter the area. The spilled oil is usually spread on the water surface in a number of blocks or separate films, so that the lighter or boat has to move around in the area to collect it. Furthermore, the spilled oil film is usually very thin, and suction pumps have to deal with a considerably large amount of water together with a comparatively small amount of the spilled oil. Accordingly, the efficiency of the suction pumps, and accordingly, the efficiency of oil recovery operations is very low.

Thus, there is a need for a means which is capable of forming a comparatively thick oil film on the water surface by collecting a number of separate oil films. With such a thick oil film, the efficiency of oil recovery operations will be improved.

Therefore, an object of the present invention is to meet the aforesaid need by providing an oil recovery system which can recover spilled oil at a high efficiency. With the system of the present invention, spilled oil films located at different spots or spread over a comparatively wide area is collected to a limited small area, so as to form a comparatively thick oil layer. Furthermore, with the system of the invention, practically entire amount of oil spilled on water surface may be recovered if so desired.

SUMMARY OF THE INVENTION

According to the present invention, a linear oil fence assembly of a certain length is moved on the water surface by pulling opposite longitudinal ends of the linear oil fence assembly by one or two boats, so as to form a mobile U-shaped oil fence line. The oil fence assembly to be used in the system according to the present invention includes an elongated belt member having two parallel longitudinal edges each can flex in the longitudinal direction of the belt member, a flexible float means, preferably tubular, connected to the belt member so as to extend in the longitudinal direction of the belt member, a flexible reinforcing means secured to the belt member to reinforce the belt member in the width direction thereof, and a weight means secured to one of said two edges so as to be distributed over the entire length of the belt member. An example of such oil fence assembly is disclosed by the present applicants in their copending U.S. Pat. application Ser. No. 232,399 titled "An Oil Fence," which was filed on Mar. 7, 1972. As pointed out in the specification of the above-referred U.S. Pat. application, pages 3 and 4, the oil fence assembly of the aforesaid construction has a high "wave-profiling flexibility," or ability to flex in accordance with the profile of water surface, so that it effectively prevents oil or drifts from overflowing the oil fence line or passing underneath the oil fence line. The present invention is, however, not restricted to the oil fence structure of the aforesaid U.S. Patent application.

With the oil recovery system according to the present invention, the U-shaped oil fence line is moved on the water surface so as to sweep the spilled oil into an area defined between two leg portions of the U-shaped oil fence line and to guide the oil to the closed end portion of the U-shaped oil fence line. To facilitate the formation of a thick oil layer, in one embodiment of the invention, two bridging belt members, i.e., a first and a second bridging belt members, are provided at the closed end of the U-shaped oil fence line, so as to extend across the two facing leg portions of the U-shaped oil fence line. The two bridging belt members are similarly constructed as the oil fence line belt and are disposed substantially in parallel to the central portion of the oil fence line belt member lying between the two leg portions thereof, with the first bridging belt member being located closer to the central portion of the oil fence line belt member than the second bridging belt member is. As a result, two closed loops of the belt members (to be referred to as "closed belt loop", hereinafter) are formed at the closed end portion of the U-shaped oil fence line: namely, a first closed belt loop defined by the aforesaid central portion of the oil fence line belt member and the first bridging belt member, and a second closed belt loop defined between the first and second bridging belt members. Each of the bridging belt members has a plurality of openings disposed just below its water line, i.e., a line corresponding to the water surface, so that the oil passes through such openings into water surface sections surrounded by the closed belt loops. Within the water surface sections surrounded by the closed belt loops, the water surface is kept comparatively calm. Thereby, the spilled oil transferred into the aforesaid water surface sections is gradually built up into a comparatively thick oil film floating on the water surface. More particularly, the spilled oil on the water surface surrounded by the U-shaped oil fence line is at first collected within the second closed belt loop to form a comparatively thick oil film, and the recovered oil film is then transferred into the first closed belt loop to form a still thicker oil film. A suitable oil removing means, such as an oil suction pipe, is disposed in the first closed belt loop, for removing the oil from the first closed belt loop to a suitable storing means, e.g., an oil tank carried by an operating boat.

With the use of the bridging belt members and closed belt loops formed thereby, spilled oil films dispersed on water surface can be recovered at a comparatively high efficiency.

In order prevent the generation of turbulence or eddy current in each of the water surface sections surrounded by the closed belt loops, it is preferable to provide a planar bottom membrane below such water surface sections. The flexible membrane bottom for the second closed belt loop should preferably extend from an intermediate portion of the second bridging belt member obliquely downwardly to the lower edge of the first bridging belt member. Similarly, the planar bottom membrane for the first closed belt loop should preferably extend from an intermediate portion of the first bridging belt member obliquely downwardly to the lower edge of the central portion of the oil fence line belt member. Each of the bottom membranes is preferably provided with water discharge holes at the lower end thereof, so as to discharge water therethrough for releasing water pressure within the closed belt loop.

It should be understood that the number of the bridging belt members to be used in conjunction with the U-shaped oil fence line is not restricted two. According to the present invention, one such bridging belt member or three or more of such bridging belt members can be used, for providing one stage or three or more stages of oil film thickening operations. The inventors, however, have found out that two stages of such thickening of the spilled oil film are satisfactory for most applications.

BRIEF DESCRIPTION OF THE DRAWING

For a better understanding of the invention, reference is made to the accompanying drawing, in which:

FIGS. 1A and 1B are schematic perspective views, illustrating oil recovering systems, according to the present invention, which are driven by two boats and one boat, respectively;

FIGS. 2A and 2B are a front view and a vertical sectional view of an oil fence assembly, respectively;

FIG. 3 is a schematic perspective view of the closed end portion of a U-shaped oil fence line to be used in the oil recovery system of FIG. 1A;

FIG. 4 is a vertical sectional view, taken along the line IV—IV of FIG. 3; and

FIG. 5 is a schematic perspective view of a modification of the structure of FIG. 3.

Like parts are designated by like numerals throughout the drawing.

DESCRIPTION OF THE PREFERRED EMBODIMENTS

Figure 1A:
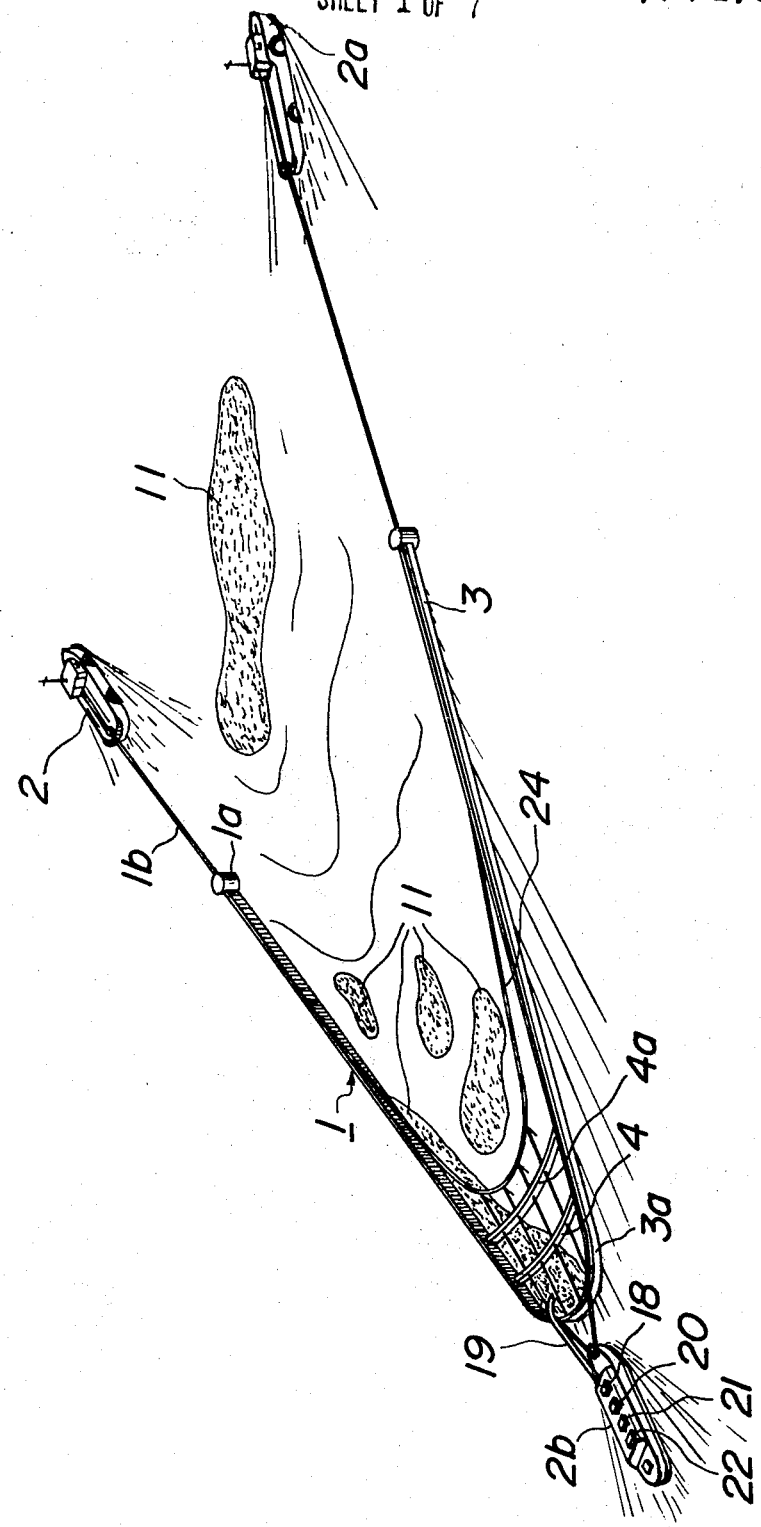

Referring to FIG. 1A, an oil recovery system 1, according to the present invention, is pulled or drawn by two boats 2 and 2a for recovering spilled oil 11 floating on water surface. The oil recovery system 1 includes a linear oil fence assembly having an elongated belt member 3, which is preferably flexible. Being drawn by the two boats, the belt member 3 is bent into a U-shape. Two end floats 1a are provided at the opposite longitudinal ends of the elongated belt member 3 to facilitate the connection of the oil recovery system 1 to the boats, for instance, through ropes 1b. A machine boat 2c is connected to the rear end of the oil recovery system 1, relative to the moving direction of the boats 2 and 2a. The machine boat 2c carries various machines to actuate the oil recovery system, which include an air compressor 22 for inflating tubular floats 5a, 5b (FIG. 2B) for keeping the elongated belt member 3 afloat, a suction pump 18 for sucking the spilled oil 11 through a suction hose 19, an oil-water separator 20, and an oil tank 21 for storing oil recovered from the water surface.

When the amount of spilled oil 11 is comparatively small, a small oil recovery system 1 including a U-shaped belt member 3 may be used, which can be drawn by a single boat 2, as shown in FIG. 1B. In this case, all the machines necessary for floating an oil fence line and recovering the spilled oil may be carried by the boat drawing the oil recovery system.

In order to collect the spilled oil at the closed end of the U-shaped belt member 3 and to accumulate the oil in the form of a comparatively thick oil film, one or more bridging belt members are provided, so as to bridge the two legs of the U-shaped flexible belt member 3. In either of the embodiments of FIGS. 1A and 1B, two bridging belt members 4 and 4a are used, which are disposed substantially in parallel to the central portion of the elongated belt member 3 connecting the two leg portions of the U-shape.

The construction of the bridging belt members is identical to that of the elongated belt member 3 of the oil fence assembly.

Figure 2A:
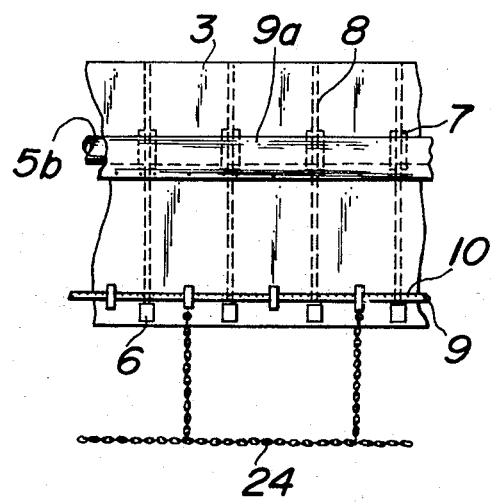

Referring to FIGS. 2A and 2B, a float means 5 is secured to the belt member 3, which float means includes a pair of flexible and inflatable tubes 5a and 5b bonded to opposite surfaces of the belt 3 by fastening straps 7. The structure of the float means 5 is not restricted to such tubes 5a and 5b. Upon inflation of the tubes 5a and 5b, the belt member 3 floats. To keep the plane of the belt member 3 substantially vertical across the water surface, a plurality of reinforcing bars 8, each carrying a weight member at one end thereof, are fastened to or embedded in the belt member 3. Thus, that edge of the belt member 3 wherein the weight members 6 are embedded sinks in water, and the tubular float means 5 and the weight members 6 act to hold the width direction of the belt member 3 substantially upright, as shown in FIG. 2B. The belt member 3 is preferably made of rubber or other water-resistant elastomer material. The belt member 3 and the flexible tubular float means 5 are required to be highly flexible in a direction perpendicular to the water surface, when afloat, so that the oil fence line formed thereby flexes in accordance with the profile of water surface, such as different wave profiles. Whereby, the belt member 3 acts to keep oil or other sea drifts on one side of the belt member 3 even when the shape of the water surface profile varies. The suitable material of and performance requirement on the belt member 3 are more fully discussed in the aforesaid copending U.S. Patent application filed on Mar. 7, 1972.

For certain applications, it is preferable to form a stream of air bubbles directed from the belt member 3 to the inside of the water surface area surrounded by the U-shaped oil fence line. Such air bubble flow may accelerate the accumulation of the oil particles into a thick film. In the embodiment of FIGS. 2A and 2B, an air tube 9 having a plurality of air nozzles 10 is secured to the belt member 3 along its weighted edge. A suitable air bubble guide 9a is mounted on the belt member 3 so as to direct the air bubbles in the aforesaid desired direction, at a position immediately above the air nozzles of the air tube 9.

It may be recalled that the construction of the bridging belt member 4 or 4a is substantially identical with that of the belt member 3, as described above by referring to FIGS. 2A and 2B. The tubular floats 5a, 5b, and the air tube 9 are connected to a suitable air source, such as the air compressor 22 carried by the machine boat 2c.

Referring to FIGS. 3 and 4, the illustrated embodiment includes a pair of bridging belt members 4 and 4a, which extend substantially in parallel to the central portion 3a of the oil fence belt member 3. Each of the bridging belt members 4 and 4a has its opposite longitudinal ends secured to corresponding leg portions of the U-shaped belt member 3. A plurality of openings 12 and 12a are bored through the bridging belt members 4 and 4a, respectively. The openings 12 and 12a are disposed just below the tubular float means 5, so as to be located just below the water line of the bridging belt member or below the water surface when the oil recovery system is in operation. As a result, two oil-collecting zones are formed: namely, a first oil-collecting zone 13 surrounded by the central portion 3a of the oil fence line belt member 3 and the first bridging belt member 4, and a second oil-collecting zone 13a defined between the first bridging belt member 4 and the second bridging belt member 4a.

Planar bottom membranes 14 and 14a may be provided at the bottom of the oil-collecting zones 13 and 13a, respectively. The planar membranes 14 and 14a are preferably made of a material which passes water but not oil. In the illustrated embodiment, the bottom membrane 14 extends obliquely downwardly from an intermediate portion of the first bridging belt member 4 to the lower edge of the central portion 3a of the belt member 3, and the second flexible membrane 14a also extends obliquely downwardly from an intermediate portion of the second bridging belt member 4a to the lower edge of the first bridging belt member 4. Water discharge holes 15 and 15a are bored through the bottom membranes 14 and 14a at the lower ends thereof, respectively. Similar water discharge holes 3b may be bored through the oil fence belt member 3 at suitable positions below the aforesaid flexible membranes 14 and 14a. Such water discharge holes 15, 15a and 3b, facilitate the movement of the oil recovery system, without impairing the oil-collecting efficiency thereof.

For simplicity, FIG. 3 shows the tubular float means 5 as consisting of only one flexible tube, but it is of course possible to use two flexible tubes 5a and 5b, as shown in FIG. 4.

To remove the recovered or collected oil film 11, an oil-collecting tube 16 is disposed along the central portion 3a of the oil fence line belt member 3, as shown in FIG. 4. A plurality of oil inlet openings 17 are formed on this oil-collecting pipe 16, and the pipe 16 is connected to the suction pump 18 through a suction hose 19 (FIG. 1A). The oil is then delivered from the pump 18 to the oil-water separator 20. The oil recovered at the oil-water separator is stored in the oil tank 21.

To facilitate the drawing, or traction, of the oil recovery system 1, a tension member 24, e.g., a chain, may be hung from the lower edge of the flexible belt member 3, as shown in FIGS. 2A and 2B. In the illustrated embodiment, such tension member 24 is provided only to the leg portions of the U-shaped flexible member 3, and the two portions of the tension members 24 for the two legs are joined together by a link member 25 in front of the second oil-collecting zone 13a, relative to the travelling direction of the system 1. Upper tension members 26 extend between the link member 25 and the central portion 3a of the oil fence line belt member 3, while lower tension members 27 extend from the link member 25 and the bottom membrane 14a and between the lower edge of the first bridging belt member 4 and the bottom membrane 14, as shown in FIGS. 3 and 4. Such additional tension members 26 and 27 act to reinforce the formation of the oil-collecting zones 13 and 13a and to facilitate the traction of such zones by the boats 2 and 2a.

In operation of the oil recovery system 1 of the aforesaid construction, as the boat 2 or boats 2 and 2a draw the U-shaped oil fence line including the belt member 3, oil films 11 on the water surface are collected in the second oil-collecting zone 13a through the openings 12a of the second bridging belt member 4a. The water coming into the second oil-collecting zone 13a is discharged through the openings 15a and the water-passing bottom membrane 14a. At the same time, the water surface in the second oil-collecting zone 13a is kept calm by the belt members 3, 4 and 4a surrounding the zone, so that the oil coming into the zone 13a is collected as a film floating on the water surface of the zone, as shown in FIG. 4. The oil collected in the zone 13a is then transferred into the first oil-collecting zone 13 through the openings 12 of the first bridging belt member 4. The water incoming to the first zone 13 is also discharged through the holes 15 and the bottom membrane 14, while the incoming oil is accumulated at the top surface of the first oil-collecting zone 13. Thus, a comparatively thick oil film is formed in the first oil-collecting zone 13. With such comparatively thick oil film, the oil pumping system inclusive of the pump 18 and the hoses 16, 19 and the oil-water separator 20 can be operated at a high efficiency in terms of oil recovery.

In one embodiment of the present invention, the distance from the end float 1a to the second bridging belt member 4a was about 30 meters, and the distance between the first and second bridging belt members 4 and 4a was about 2 meters, the distance between the first bridging belt member 4 and the central portion 3a of the oil fence line belt member 3 was about 3 meters each, and the length of the first bridging belt member 4 between the two opposing leg portions of the oil fence line belt member 3 was about 5 meters.

It should be noted that, although the present invention has been described by way of an example which uses two oil-collecting zones 13 and 13a, the number of such oil-collecting zones may be one or three or more, depending on conditions for each application.

FIG. 5 shows a modification of the structure of FIG. 3. In this modification three bridging belt members 4, 4a, and 4b are disposed across the opposing leg portions of a U-shaped belt member 3. The bridging belt members are kept afloat by a plurality of spherical float members 5f, instead of the tubular float means of the preceding embodiment. A plurality of water-passing holes 15b are bored at the lower edge portions of the bridging belt members and at the bottom edge of the central portion of the U-shaped belt member 3.

As described in the foregoing disclosure, according to the present invention, the thickness of spilled oil film to be recovered can be increased by accumulating such oil film in one or more oil-collecting zones, where water surface is kept calm. Thereby, the overall efficiency of oil recovering system, especially that of oil pumping and separating processes, is greatly improved.

The invention has been described by referring to the operation of collecting spilled oil on water surface, but it is apparent that the system can be applied for recovering any other drifts, liquid or particles, floating on water surface.

What is claimed is:

1. An oil recovery system for collecting spilled oil from water surface, comprising:
an elongated oil fence line having an elongated belt member, a pair of hollow flexible float members secured to opposing surfaces of the belt member so as to extend in the longitudinal direction of the belt and weight means distributed along one longitudinal edge of the belt member, said oil fence line being capable of flexing along the profile of the water surface;

means for moving said oil fence line on the water surface while bending the oil fence line into a U-shape by simultaneously pulling opposite longitudinal ends thereof so as to sweep spilled oil films to the inside of said U-shaped oil fence line;

a first bridging belt member extending across two parallel leg portions of said U-shaped oil fence line in the proximity of the central portion of said oil fence line interconnecting said two leg portions; said first bridging belt member having spaced passages formed therethrough just below the water line thereof;

a first oil collecting zone surrounded by said first bridging belt member and said central portion of said oil fence line belt member;

a first bottom member extending obliquely downwardly from a vertically intermediate portion of the first bridging belt member to the lowermost edge of said central portion of said oil fence line, said bottom member having spaced water discharge passages formed therethrough at a lowermost edge thereof;

at least one second bridging belt member extending across the two leg portions of said U-shaped oil fence line in parallel to said first bridging belt member on the side of said oil fence line moving means so as to define at least one second oil collecting zone, said second bridging member having spaced passages formed therethrough just below the water line thereof;

at least one second bottom member extending obliquely downwardly toward said central portion of said oil fence line from a vertically intermediate portion of the second bridging belt member to the lowermost edge of the adjacent bridging belt member, said second bottom member having spaced water discharge passages formed therethrough at a lowermost edge thereof; and oil removing means operatively connected to said first oil collecting zone.

2. An oil recovery system according to claim 1, wherein said bottom members are permeable to water but not to oil.

3. An oil recovery system according to claim 1, wherein said elongated belt member has water discharge openings located below said first oil-collecting zone near the lower edge of said belt member.

4. An oil recovery system according to claim 1 and further comprising a tension means extending along said elongated belt member.

5. An oil recovery system according to claim 1 and further comprising an air bubble generating means secured to the inner surface of said elongated belt member.

* * * * *